(12) United States Patent
Jung

(10) Patent No.: US 8,523,239 B2
(45) Date of Patent: Sep. 3, 2013

(54) FLEXIBLE HOSE ASSEMBLY WITH JOINT

(75) Inventor: Ho Jin Jung, Siheung-si (KR)

(73) Assignee: Seung Jin Ind. Co., Ltd, Ansan-Si, Gyeonggi-Do (KR)

( * ) Notice: Subject to any disclaimer, the term of this patent is extended or adjusted under 35 U.S.C. 154(b) by 271 days.

(21) Appl. No.: 12/841,517

(22) Filed: Jul. 22, 2010

(65) Prior Publication Data

US 2011/0297267 A1 Dec. 8, 2011

(30) Foreign Application Priority Data

Jun. 4, 2010 (KR) .................. 10-2010-0052710
Jun. 22, 2010 (KR) .................. 10-2010-0059024

(51) Int. Cl.
*F16L 51/02* (2006.01)
*F16L 55/07* (2006.01)
*F16L 35/00* (2006.01)
*F16L 33/01* (2006.01)

(52) U.S. Cl.
USPC .......... 285/13; 285/386; 285/222.1; 285/226; 285/924

(58) Field of Classification Search
USPC ............ 285/13, 14, 924, 222.1, 222.2, 222.3, 285/222.4, 222.5, 903, 354, 386, 226
See application file for complete search history.

(56) References Cited

U.S. PATENT DOCUMENTS

| | | | | |
|---|---|---|---|---|
| 1,539,327 A | * | 5/1925 | Phillips | 285/222.2 |
| 1,809,874 A | * | 6/1931 | Stone | 285/222.5 |
| 2,848,254 A | * | 8/1958 | Millar | 285/222.5 |
| 2,858,147 A | * | 10/1958 | Guarnaschelli | 285/222.5 |
| 3,584,900 A | * | 6/1971 | Lennon et al. | 285/14 |
| 4,063,757 A | * | 12/1977 | Fuhrmann | 285/222.1 |
| 6,742,815 B2 | * | 6/2004 | McCurdy et al. | 285/276 |
| 6,866,302 B2 | * | 3/2005 | Furata | 285/256 |
| 7,726,701 B2 | * | 6/2010 | Koji et al. | 285/354 |
| 7,971,910 B2 | * | 7/2011 | Holt | 285/93 |
| 2004/0212191 A1 | * | 10/2004 | Segal et al. | 285/334.5 |
| 2005/0093294 A1 | * | 5/2005 | Anselmo et al. | 285/247 |
| 2007/0024054 A1 | * | 2/2007 | Ko | 285/354 |

FOREIGN PATENT DOCUMENTS

JP 06011084 A * 1/1994

* cited by examiner

*Primary Examiner* — James Hewitt
(74) *Attorney, Agent, or Firm* — Kile Park Reed & Houtteman PLLC

(57) ABSTRACT

A joint apparatus for prevention of explosion includes a bellows tube including an extension section integrally formed at one end of the bellows tube and an annular protrusion interposed between the extension section and the bellows tube; a coupling nut coupled with the bellows tube; and a connection member coupled with the bellows tube while being supported by the annular protrusion. A gap is formed between a extension section and the connection member and gas discharged from the bellows tube flows along the outer surface of the extension section through the gap and is discharged to an outside through a rear section of the annular protrusion. Since a travelling path of the gas is lengthened, pressure and temperature of the gas are lowered, so that gas explosion is prevented.

5 Claims, 9 Drawing Sheets

FLEXIBLE HOSE ASSEMBLY WITH JOINT

BACKGROUND OF THE INVENTION

1. Field of the Invention

The present invention relates to a flexible hose assembly with a joint. More particularly, the present invention relates to a flexible hose assembly with a joint, in which an extension section is integrally formed at one end of a bellows tube and the extension section is coupled with a connection member, so that gas leaked through an opening of the bellows tube may be discharged to the outside after being traveled along an outer surface of the extension section. Thus, the travelling path of the gas is lengthened, so that the pressure and temperature of the gas may be lowered and the amount of gas discharged to the outside may not be suddenly increased, thereby preventing gas explosion.

2. Description of the Related Art

In general, when a wire cable is installed in the ground, the wire cable must be accommodated in an explosion-proof pipe to prevent gas explosion caused by the spark.

A plurality of explosion-proof pipes are connected to each other to lengthen the installation length and to adjust the installation angle of the explosion-proof pipe. In addition, explosion-proof joints are provided between adjacent explosion-proof pipes.

The explosion-proof pipes must be designed such that gas generated in the explosion-proof pipes can be discharged to the outside little by little.

That is, if a great amount of flammable gas is suddenly discharged to the outside, gas explosion may occur when the spark is generated, so that the gas must be discharged to the outside little by little to prevent the gas explosion.

FIG. 1 is an exploded perspective view showing a flexible hose assembly with a joint according to the related art, and FIG. 2 is a sectional view showing the assembling state of the flexible hose assembly according to the related art.

As shown in FIGS. 1 and 2, the conventional flexible hose assembly includes a bellows tube 100, a braid 110 coated on an outer surface of the bellows tube 100, and a coupling member coupled with the end of the bellows tube 100.

The coupling member includes an adapter 130 fitted with the end of the bellows tube 100, a coupling nut 120 that accommodates the adapter 130, and a connection member 140 that makes contact with the front surface of the adapter 130 such that the connection member 140 can be screw-coupled into the coupling nut 120.

In addition, a pipe 160 is coupled with the connection member 140 by a nut 170.

According to the related art, the gas is primarily discharged through an engagement section between the connection member 140 and the adapter 130 and then discharged to the outside through a screw-coupling section between the coupling nut 120 and the adapter 130, so that the bellows tube 100 may not be subject to excessive gas pressure.

However, according to the related art, since the gas having the high pressure and high temperature is discharged through the engagement section between the connection member 140 and the adapter 130, the amount of leakage gas may exceed the reference value specified in the law.

SUMMARY OF THE INVENTION

Accordingly, the present invention has been made keeping in mind the above problems occurring in the prior art, and an object of the present invention is to provide a flexible hose assembly with a joint, in which an extension section is integrally formed at one end of a bellows tube and the extension section is coupled with a connection member, so that gas leaked through an opening of the bellows tube may be discharged to the outside after being travelled along an outer surface of the extension section. Thus, the travelling path of the gas is lengthened, so that the pressure and temperature of the gas may be lowered and the amount of gas discharged to the outside may not be suddenly increased, thereby preventing gas explosion.

To accomplish the object, according to one aspect of the present invention, there is provided a flexible hose assembly comprising: a bellows tube including an extension section integrally formed at one end of the bellows tube and an annular protrusion interposed between the extension section and the bellows tube; a coupling nut coupled with the bellows tube while being prevented from being separated from the bellows tube by the annular protrusion; and a connection member coupled with the bellows tube while being supported by the annular protrusion such that the connection member is screw-coupled with the coupling nut, wherein a gap is formed between an outer surface of the extension section and an inner surface of the connection member and gas discharged from the bellows tube flows along the outer surface of the extension section through the gap and is discharged to an outside through a screw coupling section between the connection member and the coupling nut.

According to the exemplary embodiment of the present invention, a sleeve having roundness is fitted around the extension section.

A braid is coated on an outer surface of the bellows tube and an adapter is coupled around the braid.

A predetermined portion of the bellows tube corresponding to the adapter is expanded outward such that the braid is pressed against an inner surface of the adapter.

A perforation hole is formed in the connection member, screw sections are formed at both sides of the connection member, and a seat section is provided adjacent to an inlet of the perforation hole such that the annular protrusion of the bellows tube is rested on the seat section.

According to another aspect of the present invention, there is provided a flexible hose assembly comprising a bellows tube including an extension section integrally formed at one end of the bellows tube and an annular protrusion interposed between the extension section and the bellows tube; and a coupling unit including an adapter coupled around one end of the bellows tube, a coupling nut coupled with the bellows tube such that the adapter is accommodated in the coupling nut, a connection member coupled with the coupling nut while adhering to a front surface of the adapter, and an intermediate ring supported by the annular protrusion of the bellows tube and accommodated in the coupling nut while closely making contact with the connection member, wherein a plurality of slots are formed in an inner surface of the connection member, a gap is formed between an outer surface of the extension section and the inner surface of the connection member, and gas contained in the bellows tube is discharged to an outside through the slots and the gap.

According to the exemplary embodiment of the present invention, the intermediate ring is disposed between the annular protrusion and the adapter, and a groove is formed in the intermediate ring to receive the annular protrusion.

A first fastening section including a groove and a protrusion, which are concentrically formed, is provided in the connection member. A second fastening section including a protrusion and a groove, which are concentrically formed corresponding to the groove and the protrusion of the first fastening section, is provided in the intermediate ring. A gap is formed between the first and second fastening sections when the first and second fastening sections are engaged with each other.

According to the present invention, the gas is discharged to the outside while travelling along the outer surface of the extension section integrally formed at one end of the bellows tube, so that the travelling path of the gas may be lengthened. Thus, the pressure and temperature of the gas may be lowered and the amount of gas discharged to the outside may not be suddenly increased, so that gas explosion can be prevented.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
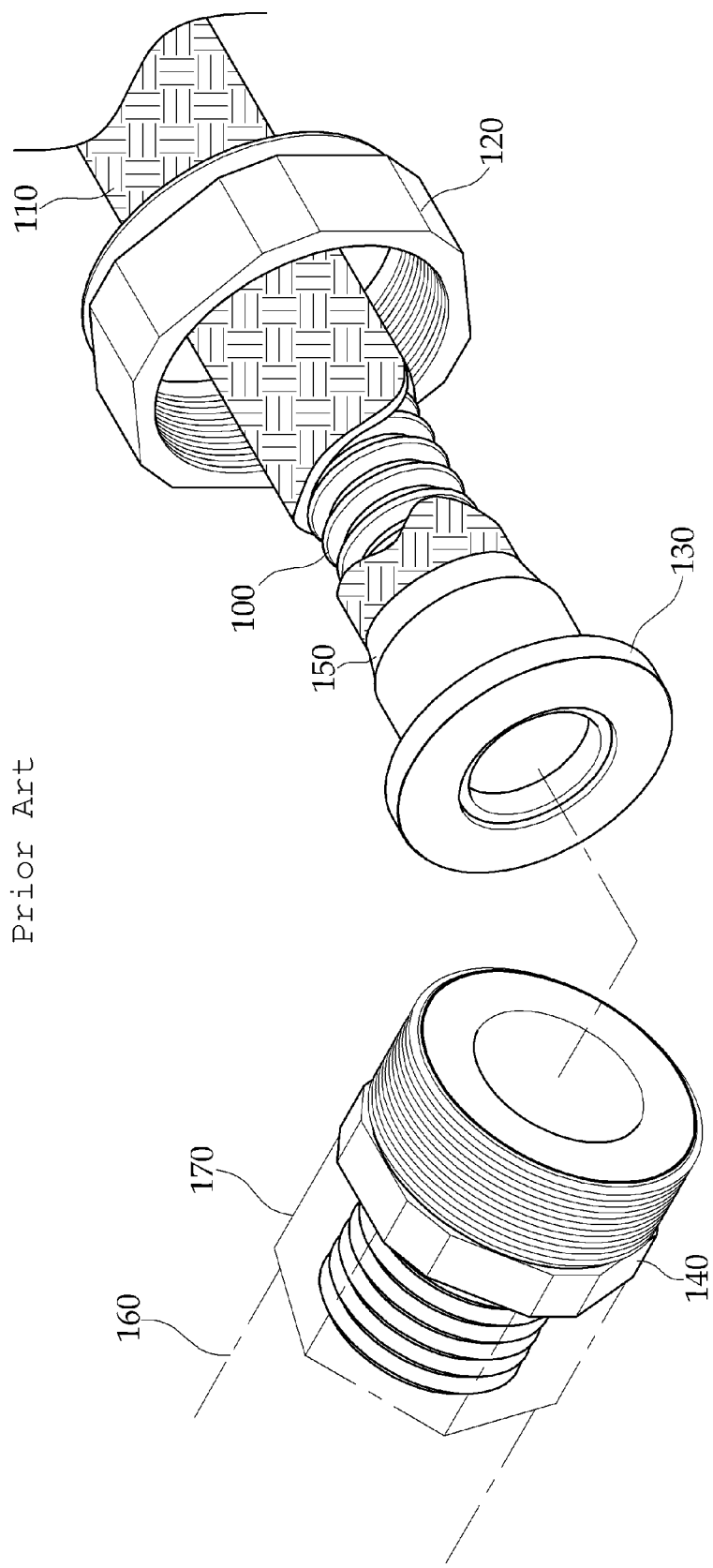
FIG. 1 is an exploded perspective view showing a flexible hose assembly with a joint according to the related art.
Figure 2:
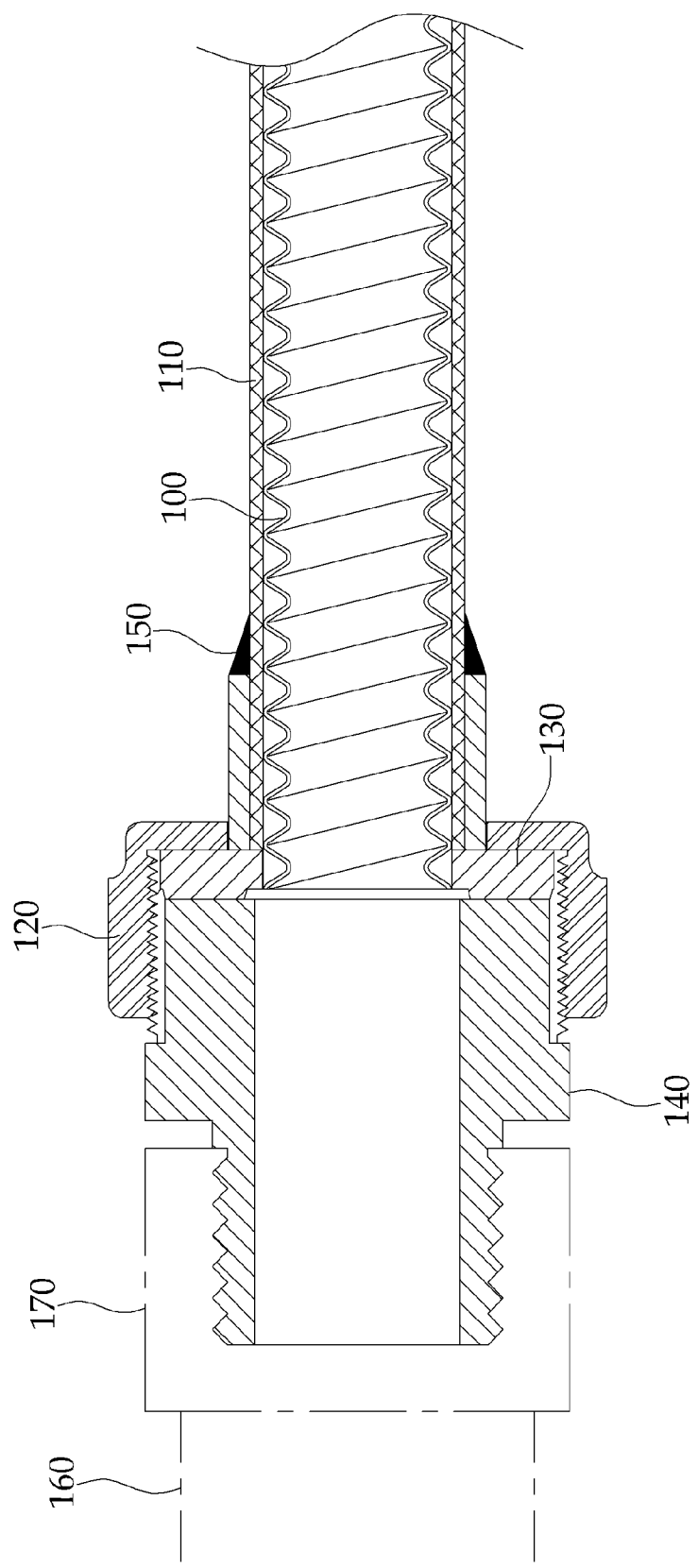
FIG. 2 is a sectional view showing an assembling state of a flexible hose assembly with a joint according to the related art.

Hereinafter, exemplary embodiments of the present invention will be described in detail with reference to accompanying drawings. The same reference numerals will be used to designate the same elements throughout the drawings. Detailed description about well known functions or configurations may be omitted if it makes the subject matter of the present invention unclear.

Figure 3:
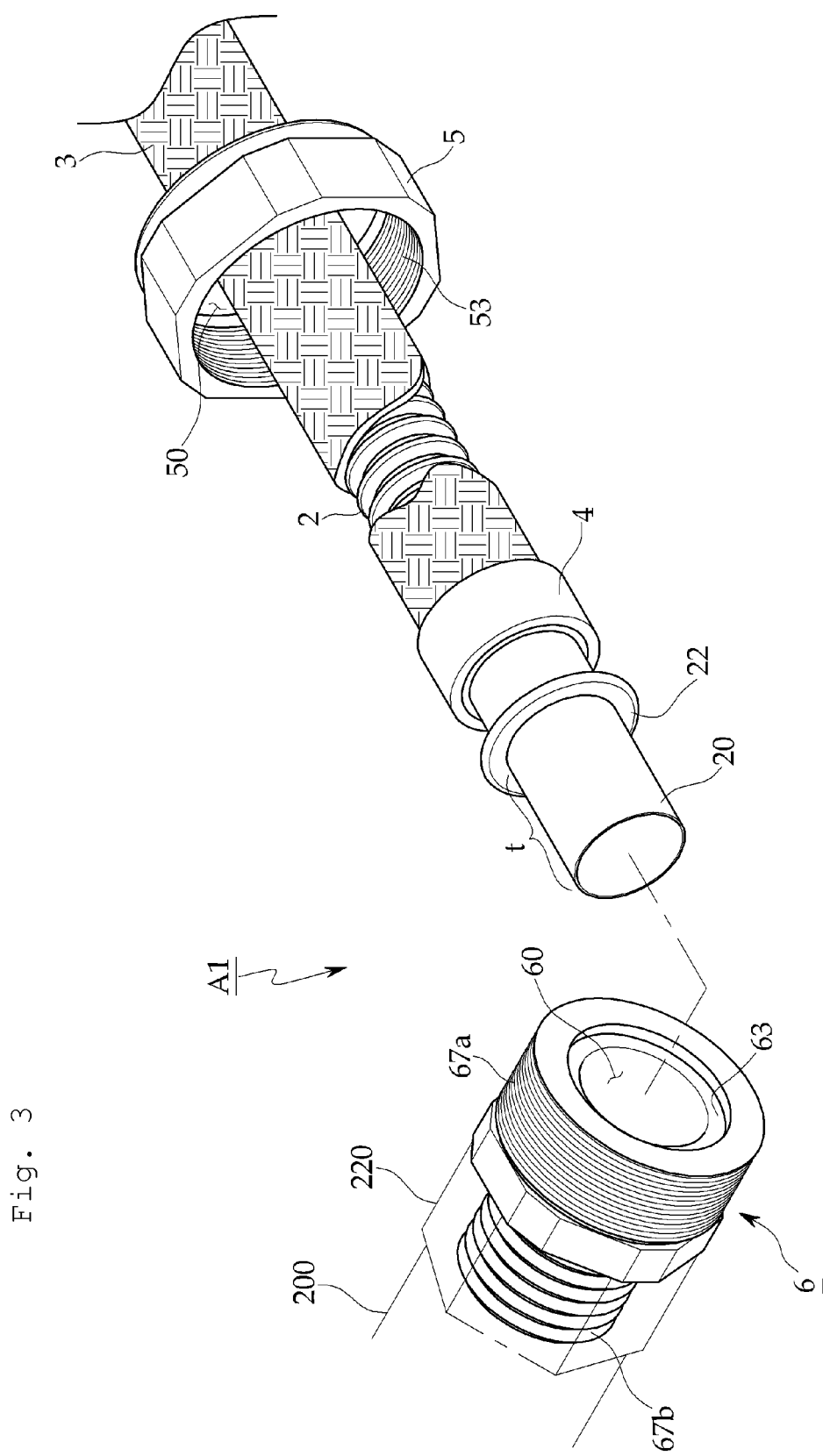
FIG. 3 is an exploded perspective view showing a flexible hose assembly with a joint according to the first embodiment of the present invention.
Figure 4:
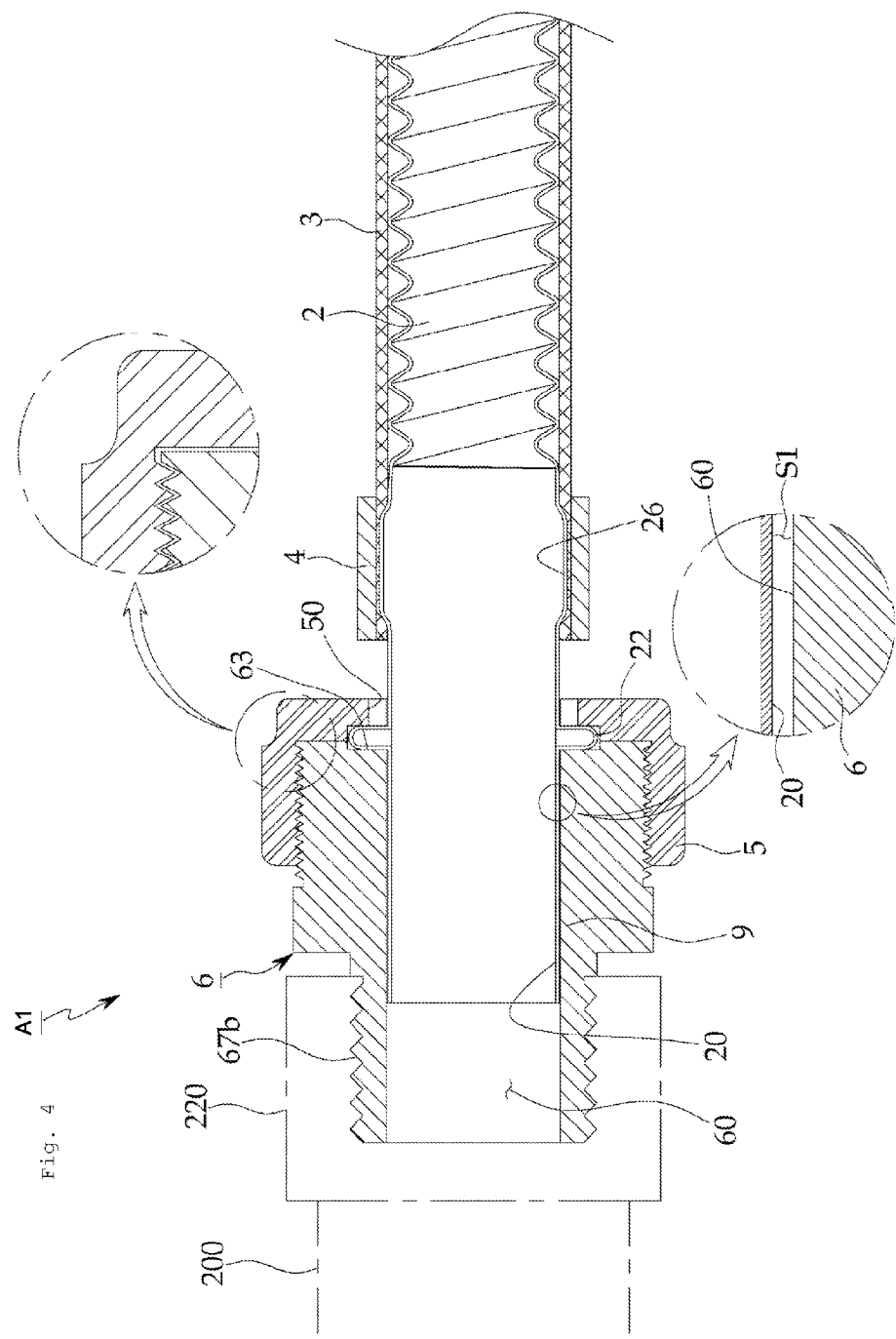
FIG. 4 is a sectional view showing an assembling state of a flexible hose assembly with a joint according to the first embodiment of the present invention.

FIG. 3 is an exploded perspective view showing a flexible hose assembly with a joint according to the first embodiment of the present invention, and FIG. 4 is a sectional view showing an assembling state of the flexible hose assembly with the joint according to the first embodiment of the present invention.

As shown in FIGS. 3 and 4, the flexible hose assembly A1 with the joint according to the first embodiment of the present invention includes a bellows tube 2 including an extension section 20 integrally formed at one end of the bellows tube 2 and an annular protrusion 22 interposed between the extension section 20 and the bellows tube 2, a coupling nut 5 coupled with the bellows tube 2 while being prevented from being separated from the bellows tube 2 by the annular protrusion 22, and a connection member 6 coupled with the bellows tube 2 while being supported by the annular protrusion 22 such that the connection member 6 is screw-coupled with the coupling nut 5.

The bellows tube 2 is a bendable corrugated tube having compression and expansion property.

The extension section 20 has a length t of about 16 to 20 mm with a smooth outer surface.

A braid 3 is coated around an outer surface of the bellows tube 2.

After the adapter 4 has been coupled around the outer surface of the braid 3, a predetermined portion of the bellows tube 2 corresponding to the adapter 4 is expanded outward, thereby forming an expansion section 26. Due to the expansion section 26, the braid 3 is pressed against an inner surface of the adapter 4, so that the braid 3 is fixed to the adapter 4 (see, FIG. 4).

The adapter 4 has a predetermined width and a diameter larger than that of the bellows tube 2. As the bellows tube 2 is expanded, the outer surface of the braid 3 is fixed to the inner surface of the adapter 4, so that an additional welding process for fixing the braid 3 is not required.

The coupling nut 5 has a recess 50 for receiving the annular protrusion 22 and a screw section 53 is formed at an inner peripheral surface of the coupling nut 5, so that the coupling nut 5 can be screw-coupled with the connection member 6.

The connection member 6 is connected to another pipe 200 as well as the bellows tube 2. The connection member 6 has a perforation hole 60 and screw sections 67a and 67b are formed at both sides of the connection member 6, respectively. The extension section 20 of the bellows tube 2 is inserted into the connection member 6.

The perforation hole 60 of the connection member 6 has a diameter slightly larger than a diameter of the extension section 20 of the bellows tube 2, so that a gap S1 is formed between the perforation hole 60 and the extension section 20, and the gas is leaked through the gap S1 (see, FIG. 4).

In addition, a seat section 63 is formed in the vicinity of the inlet of the perforation hole 60 and the annular protrusion 22 of the bellows tube 2 is rested on the seat section 63.

The screw section 67a formed at one side of the connection member 6 is screw-coupled with the screw section 53 of the coupling nut 5, and the screw section 67b formed at the other side of the connection member 6 is screw-coupled with another pipe 200 or a nut 220 of another pipe 200.

Hereinafter, the assembling process for the flexible hose assembly with the joint according to the first embodiment of the present invention will be described.

After coating the braid 3 around the outer surface of the bellows tube 2, the adapter 4 is coupled with one end of the bellows tube 2.

Then, a tool is inserted into the bellows tube 2 and the portion of the bellows tube 2 corresponding to the adapter 4 is expanded outward by using the tool, thereby pressing the braid 3 against the inner surface of the adapter 4.

After that, the coupling nut 5 is coupled around the bellows tube 2.

Then, the extension section 20 of the bellows tube 2 is inserted into the perforation hole 60 of the connection member 6 and the screw section 53 of the coupling nut 5 is screw-coupled with the screw section 67a of the connection member 6, thereby integrally forming the connection member 6 with the bellows tube 2.

As the connection member 6 has been assembled with the bellows tube 2, the fine gap S1 is formed between the outer surface of the extension section 20 of the bellows tube 2 and the inner surface of the perforation hole 60 of the connection member 6, so that the gas contained in the bellows tube 2 can be discharged through the gap S1 little by little.

Figure 5:
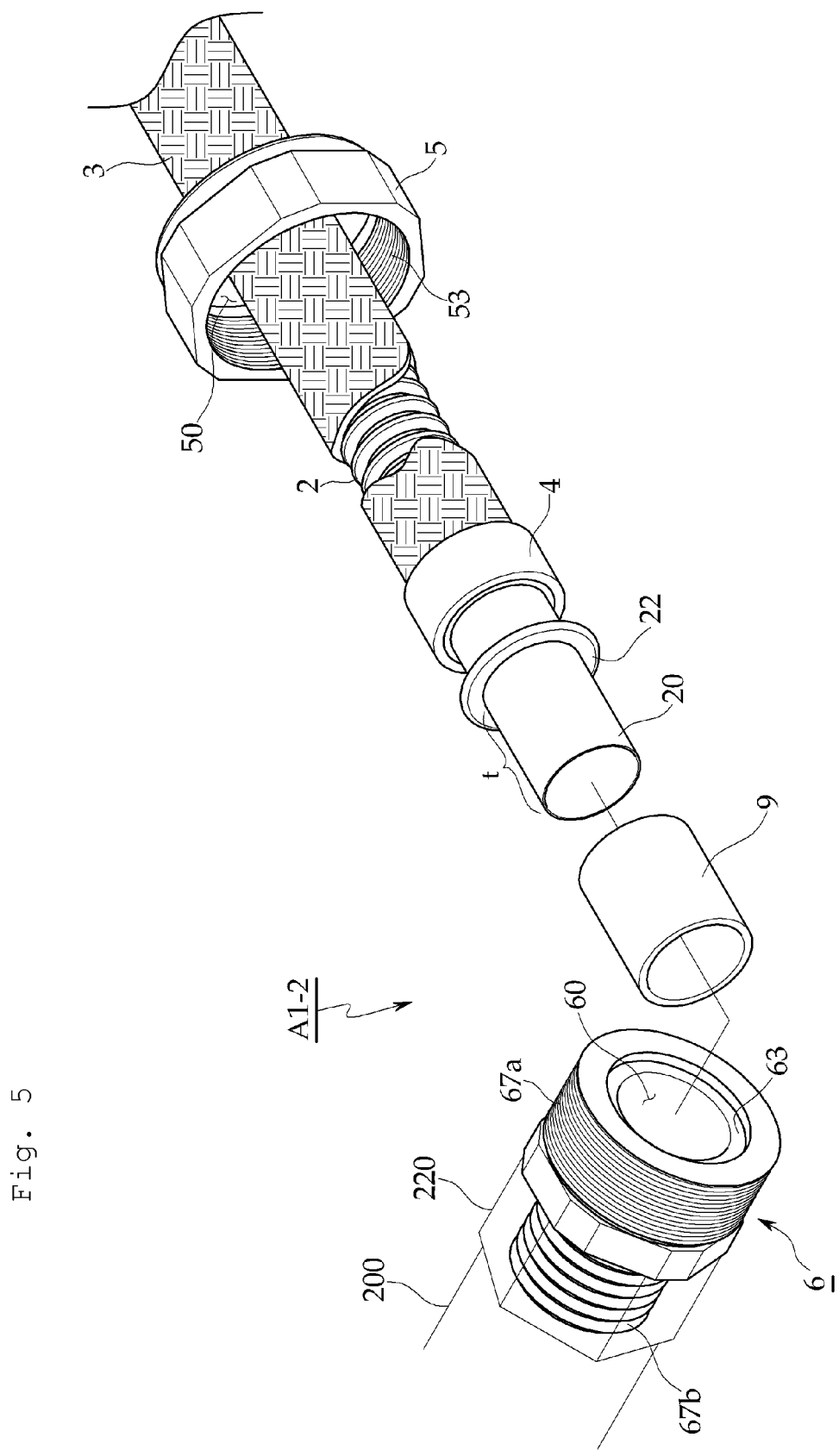
FIG. 5 is an exploded perspective view showing a flexible hose assembly with a joint according to the second embodiment of the present invention.
Figure 6:
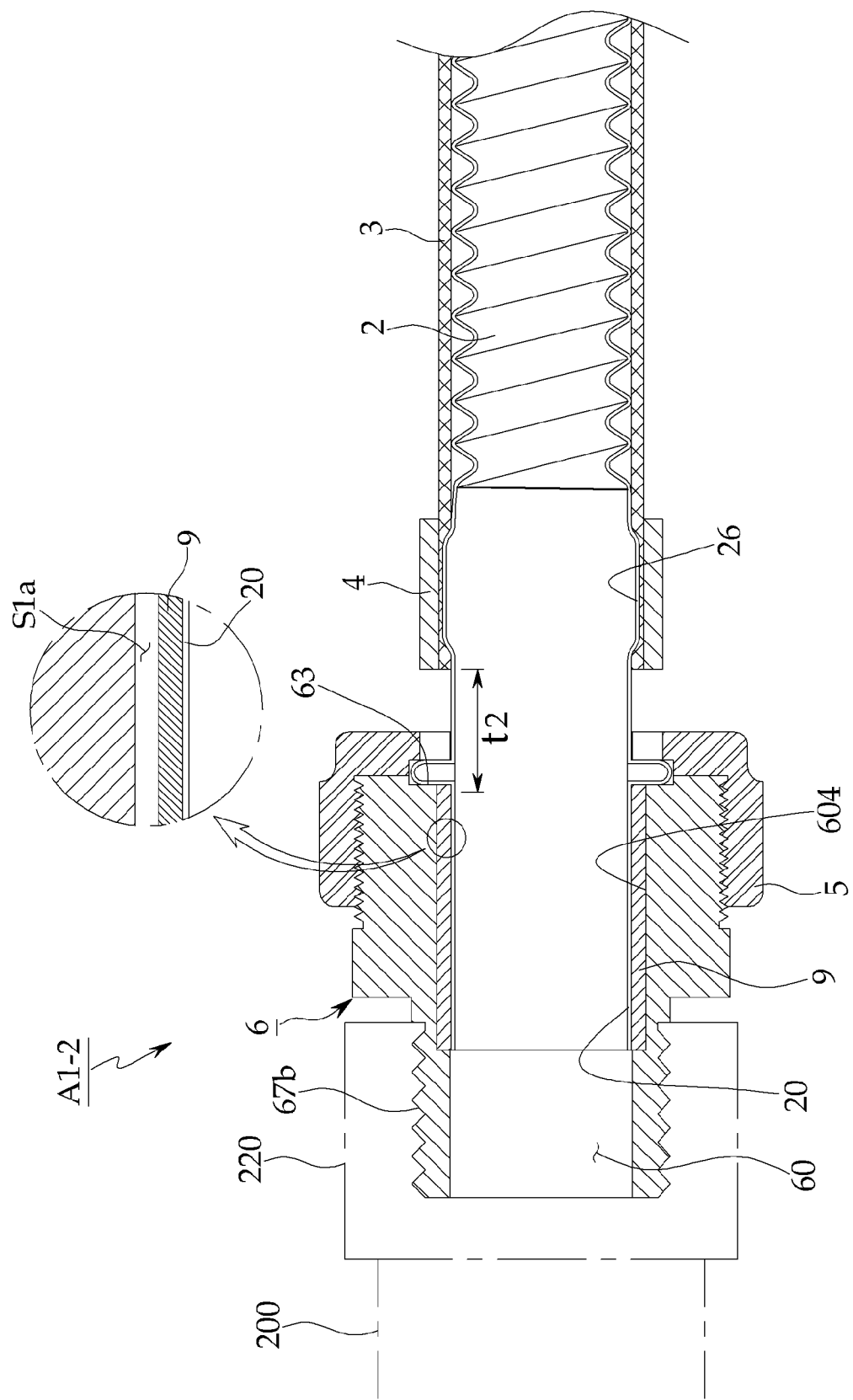
FIG. 6 is a sectional view showing an assembling state of a flexible hose assembly with a joint according to the second embodiment of the present invention.

FIG. 5 is an exploded perspective view showing a flexible hose assembly with a joint according to the second embodiment of the present invention, and FIG. 6 is a sectional view showing an assembling state of the flexible hose assembly with the joint according to the second embodiment of the present invention.

As shown in FIGS. 5 and 6, the flexible hose assembly A1-2 with the joint according to the second embodiment of the present invention includes a bellows tube 2 including an extension section 20 integrally formed at one end of the bellows tube 2 and an annular protrusion interposed between the extension section 20 and the bellows tube 2, a coupling nut 5 coupled with the bellows tube 2 while being prevented from being separated from the bellows tube 2 by the annular protrusion 22, a connection member 6 coupled with the bellows tube 2 while being screw-coupled with the coupling nut 5, and a sleeve 9 fitted around the extension section 20.

The bellows tube 2, the coupling nut 5 and the connection member 6 have already been described in the first embodiment, so they will not further described below in order to avoid redundancy.

The sleeve 9 is a cylindrical pipe having roundness. The sleeve 9 has an inner diameter equal to or slightly larger than an outer diameter of the extension section 20.

The bellows tube 2 is manufactured by rolling a bellows plate in a cylindrical shape and then welding both ends of the bellows plate to each other. At this time, since the extension section 20 has a very thin thickness, it is difficult to manufacture the extension section 20 with the roundness.

If the extension section 20 with no roundness is inserted into the connection member 6, the gap S1 is irregularly formed between the inner surface of the perforation hole 60 and the outer surface of the extension section 20. If the gap S1 is enlarged, the amount of gas discharged through the gap S1 may be increased, so that the amount of leakage gas may exceed the reference value specified in the explosion-proof standard.

Thus, in order to allow the extension section 20 to have the roundness, the sleeve 9 having the roundness is integrally fitted around the extension section 20.

In other words, if the sleeve 9 having the roundness is fitted around the extension section 20 of the bellows tube 2, the gas may be uniformly distributed while passing through the outer surface of the sleeve 9 having the roundness, so that the amount of gas discharged to the outside may satisfy the explosion-proof standard.

A coupling hole 604 is formed in the perforation hole 60 and the sleeve 9 is inserted into the coupling hole 604.

Hereinafter, the assembling process for the flexible hose assembly A1-2 with the joint according to the second embodiment of the present invention will be described.

After coating the braid 3 around the outer surface of the bellows tube 2, the adapter 4 is coupled with one end of the bellows tube 2.

Then, a tool is inserted into the bellows tube 2 and the portion of the bellows tube 2 corresponding to the adapter 4 is expanded outward by using the tool, thereby pressing the braid 3 against the inner surface of the adapter 4. Thus, the welding process for fixing the braid 3 may not be required.

After that, the coupling nut 5 is coupled around the bellows tube 2.

Then, the sleeve 9 is fitted around the extension section 20, and the extension section 20 integrally formed with the sleeve 9 is inserted into the perforation hole 60 of the connection member 6. In addition, the screw section 53 of the coupling nut 5 is screw-coupled with the screw section 67a of the connection member 6, thereby integrally forming the connection member 6 with the bellows tube 2.

As the connection member 6 has been assembled with the bellows tube 2, the fine gap S1a is formed between the outer surface of the sleeve 9 and the inner surface of the perforation hole 60 of the connection member 6, so that the gas contained in the bellows tube 2 can be discharged through the gap S1a little by little.

Since the sleeve 9 has the roundness, the gap S1a may be uniformly formed, so that the gas can be uniformly discharged.

The gas discharged through the gap S1a is exhausted to the outside through a coupling section between the coupling nut 5 and the connection member 6.

Figure 7:
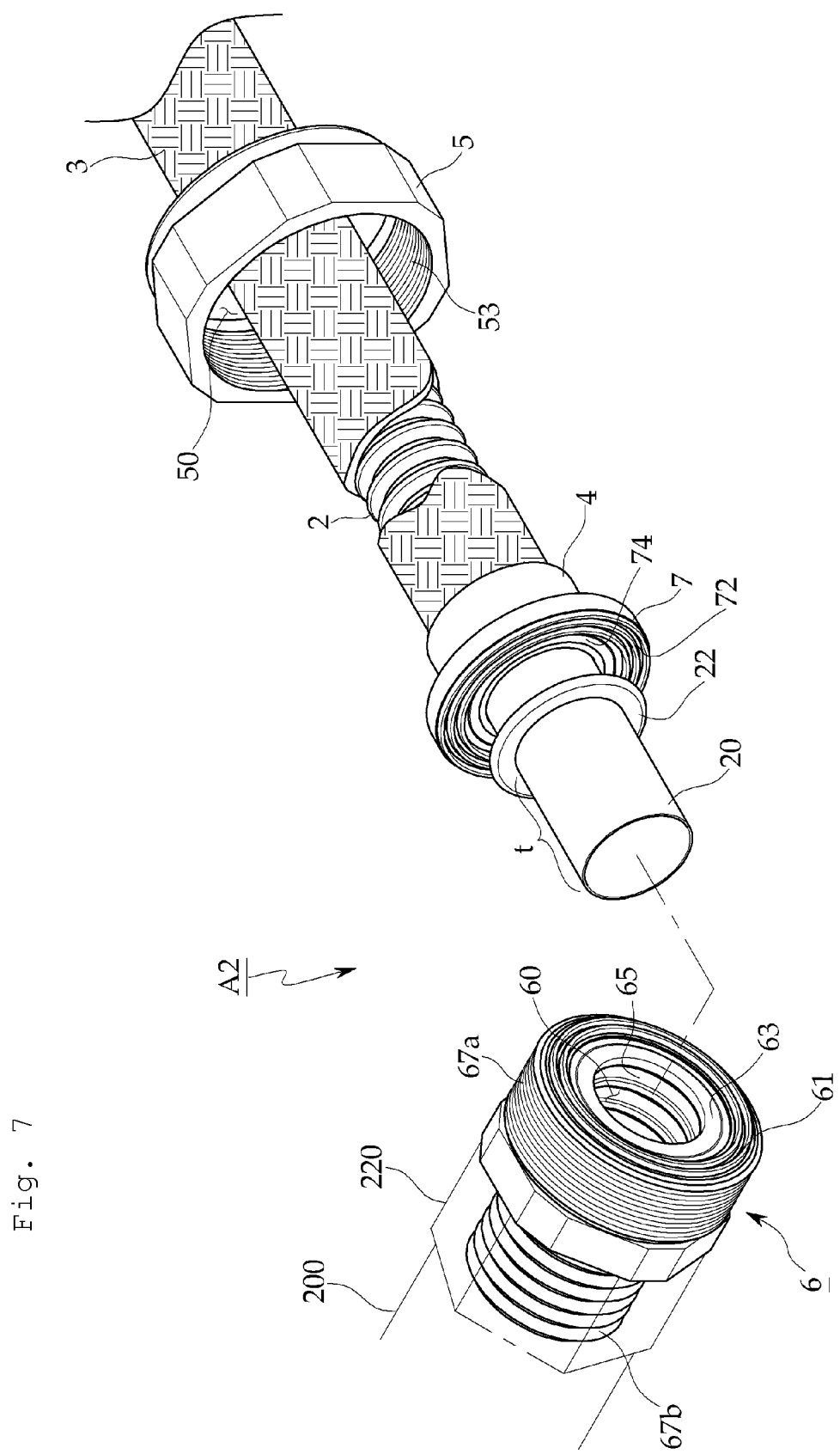
FIG. 7 is an exploded perspective view showing a flexible hose assembly with a joint according to the third embodiment of the present invention.
Figure 8:
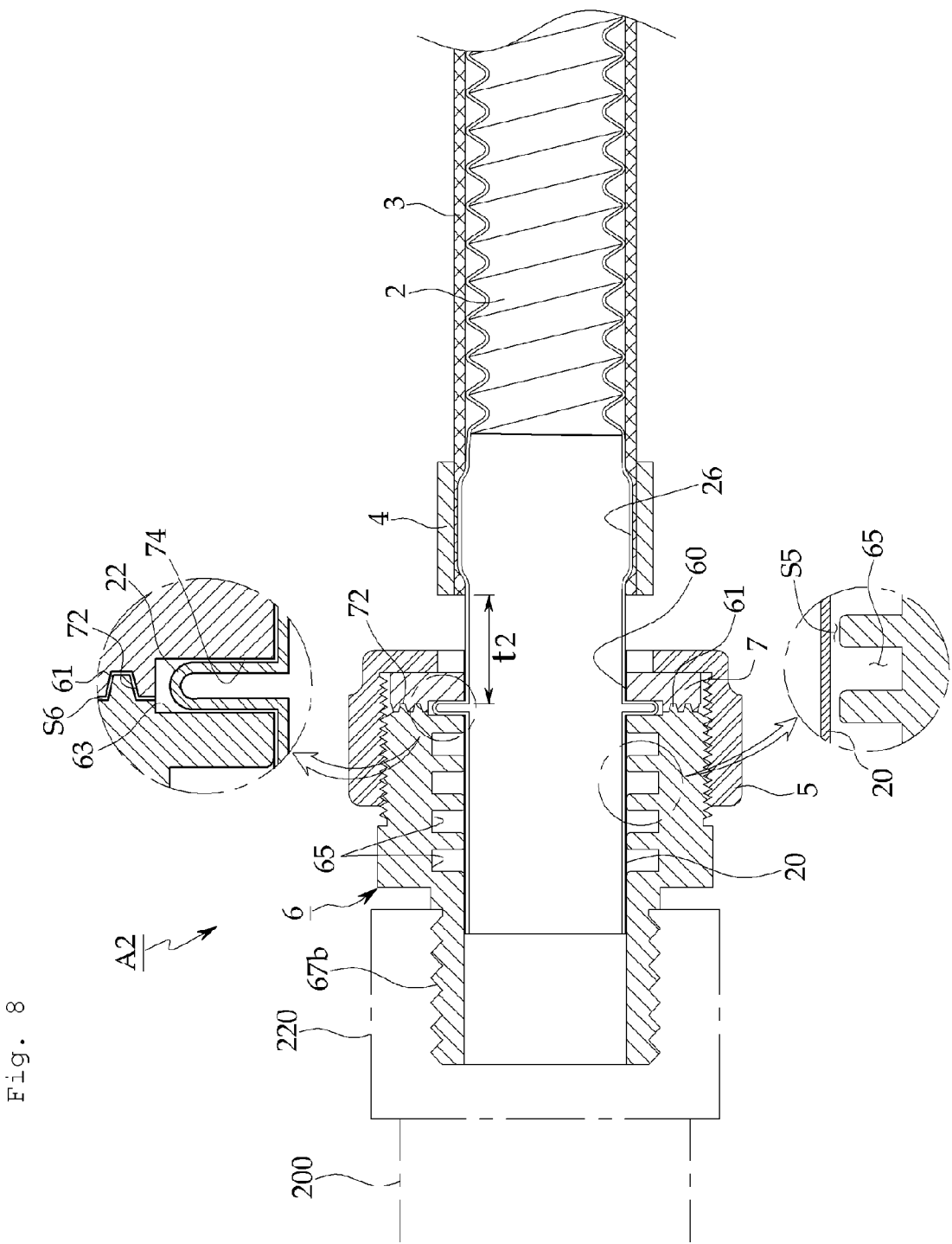
FIG. 8 is a sectional view showing an assembling state of a flexible hose assembly with a joint according to the third embodiment of the present invention.
Figure 9:
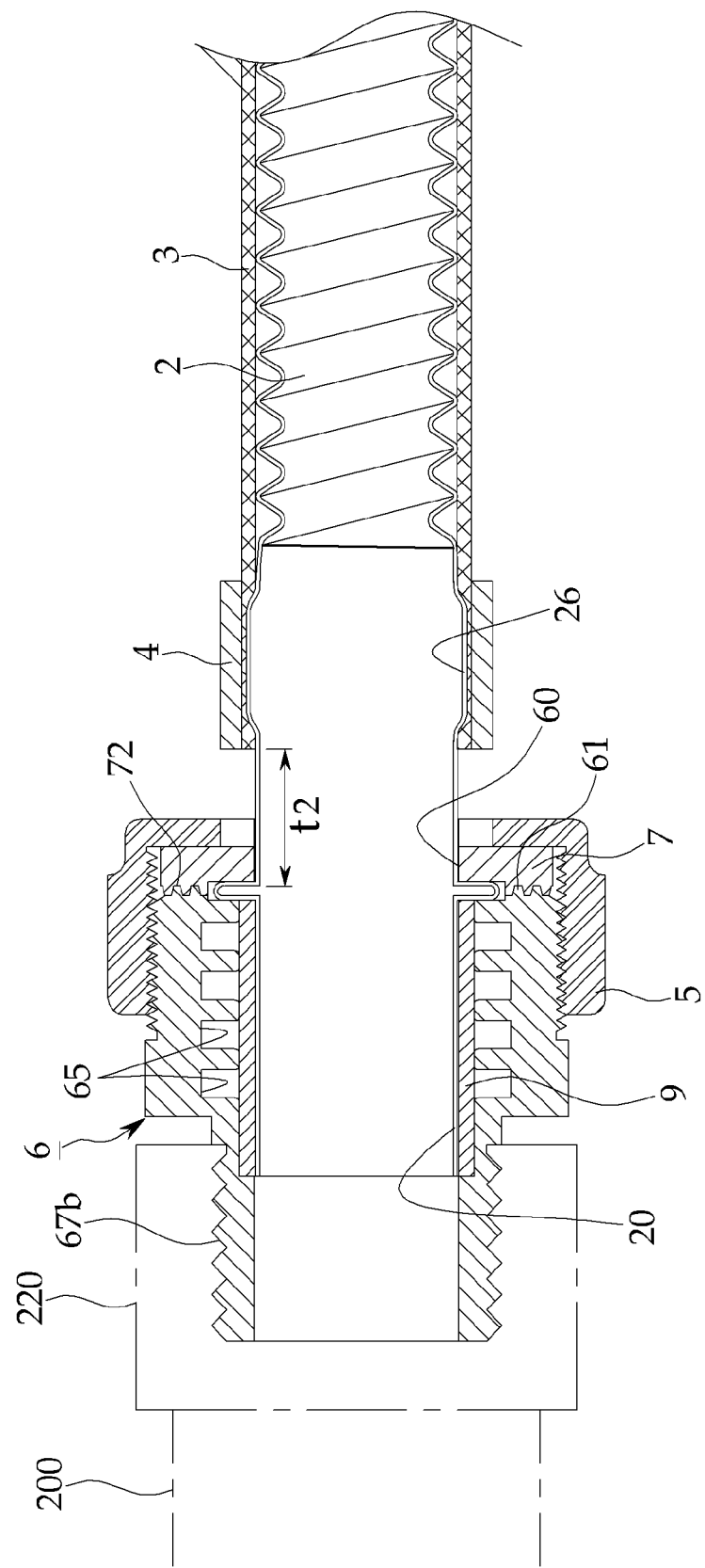
FIG. 9 is a sectional view showing an assembling state of a flexible hose assembly with a joint according to the fourth embodiment of the present invention.

FIG. 7 is an exploded perspective view showing a flexible hose assembly with a joint according to the third embodiment of the present invention, FIG. 8 is a sectional view showing an assembling state of the flexible hose assembly with the joint according to the third embodiment of the present invention, and FIG. 9 is a sectional view showing an assembling state of a flexible hose assembly with a joint according to the fourth embodiment of the present invention.

As shown in FIGS. 7 and 8, the flexible hose assembly A2 with the joint according to the third embodiment of the present invention includes a bellows tube 2 including an extension section 20 integrally formed at one end of the bellows tube 2 and an annular protrusion interposed between the extension section 20 and the bellows tube 2, and a coupling unit including an adapter 4 coupled around one end of the bellows tube 2, a coupling nut 5 coupled with the bellows tube 2 such that the adapter 4 can be accommodated in the coupling nut 5, a connection member 6 coupled with the coupling nut 5 and an intermediate ring 7 supported by the annular protrusion 22 of the bellows tube 2 and accommodated in the coupling nut 5 while closely making contact with the connection member 6.

The extension section 20 has a length t of about 16 to 20 mm with a smooth outer surface.

A braid 3 is coated around an outer surface of the bellows tube 2.

After the adapter 4 has been coupled around the outer surface of the braid 3, a predetermined portion of the bellows tube 2 corresponding to the adapter 4 is expanded outward, thereby forming an expansion section 26 in order to fix the braid. Due to the expansion section 26, the braid 3 is pressed against an inner surface of the adapter 4, so that the braid 3 is fixed to the adapter 4 (see, FIG. 8). Thus, additional welding work for fixing the braid 3 may not be required.

The adapter 4 has a predetermined width and a diameter larger than that of the bellows tube 2. As the bellows tube 2 is expanded, the outer surface of the braid 3 is fixed to the inner surface of the adapter 4.

The intermediate ring 7 has a substantially disc shape and is formed at the center thereof with a center hole into which the bellows tube 2 is inserted. The intermediate ring 7 is provided at the front surface thereof with a first fastening section 72 including a groove and a protrusion, which are concentrically formed.

In addition, an annular groove 74 is formed around the center hole of the intermediate ring 7 such that the annular protrusion 22 of the bellows tube 2 can be rested in the annular groove 74.

The intermediate ring 7 can freely move in the region t2 between the annular protrusion 22 of the bellows tube 2 and the front portion of the adapter 4.

The coupling nut 5 has a recess 50 for receiving the annular protrusion 22 and a screw section 53 is formed at an inner peripheral surface of the coupling nut 5, so that the coupling nut 5 can be screw-coupled with the connection member 6.

The connection member 6 is connected to another pipe 200 as well as the bellows tube 2. The connection member 6 has a perforation hole 60 and screw sections 67a and 67b are formed at both sides of the connection member 6, respectively. The extension section 20 of the bellows tube 2 is inserted into the connection member 6.

The perforation hole 60 of the connection member 6 has a diameter slightly larger than a diameter of the extension section 20 of the bellows tube 2, so that a gap S1 is formed between the perforation hole 60 and the extension section 20, and the gas is leaked through the gap S1.

In addition, a second fastening section 61 is formed on the front surface of the connection member 6. The second fastening section 61 includes a protrusion and a groove, are concentrically formed corresponding to the groove and the protrusion of the first fastening section 72. A seat section 63 is formed in the vicinity of the inlet of the perforation hole 60 and the annular protrusion 22 of the bellows tube 2 is rested on the seat section 63.

The second fastening section 61 of the connection member 6 is engaged with the first fastening section 72 of the intermediate ring 7.

The screw section 67a formed at one side of the connection member 6 is screw-coupled with the screw section 53 of the coupling nut 5, and the screw section 67b formed at the other side of the connection member 6 is screw-coupled with another pipe 200 or a nut 220 of another pipe 200.

In addition, a plurality of slots 65 are formed in the inner surface of the perforation hole 60 of the connection member 6.

The slots 65 are formed in a ring shape or an arc shape along the inner surface of the perforation hole 60.

As shown in FIG. 8, a fine gap S5 may be formed between the outer surface of the extension section 20 of the bellows tube 2 and the inner surface of the connection member 6, so that the gas may be leaked through the fine gap S5.

In addition, the first and second fastening sections 72 and 61 are designed such that a fine gap S6 can be formed therebetween.

Therefore, the gas generated in the bellows tube 2 can be discharged through the gaps S5 and S6 little by little and then discharged to the outside through the slots 65, so that the temperature and the pressure of the gas can be lowered when the gas is discharged to the outside.

Meanwhile, as shown in FIG. 9, the flexible hose assembly A2-2 according to the fourth embodiment of the present invention is similar to the flexible holes assembly A2 according to the third embodiment of the present invention, except for the sleeve 9 fitted around the extension section 20 of the bellows tube 2.

The sleeve 9 is a cylindrical pipe having the roundness. Since the sleeve 9 having the roundness is fitted around the extension section 20 of the bellows tube 2, the gas can be uniformly distributed while passing through the outer surface of the sleeve 9, so that the amount of gas discharged to the outside may satisfy the explosion-proof standard.

Hereinafter, the assembling process for the flexible hose assembly with the joint according to the third embodiment of the present invention will be described.

After coating the braid 3 around the outer surface of the bellows tube 2, the adapter 4 is coupled with one end of the bellows tube 2.

Then, a tool is inserted into the bellows tube 2 and the portion of the bellows tube 2 corresponding to the adapter 4 is expanded outward by using the tool, thereby pressing the braid 3 against the inner surface of the adapter 4. Thus, the additional welding process for fixing the braid 3 may not be required.

After that, the coupling nut 5 and the intermediate ring 7 are sequentially coupled around the bellows tube 2, such that they make contact with the front portion of the adapter 4.

Then, the extension section 20 and the annular protrusion 22 are formed in the bellows tube 2 in such a manner that the intermediate ring 7 can be freely moved in the region t2 without being separated from the bellows tube 2.

Next, the bellows tube 2 is inserted into the perforation hole 60 of the connection member 6 such that the outer surface of the extension section 20 make contact with the slots 65.

As the connection member 6 has been assembled with the bellows tube 2, the fine gap S5 is formed between the outer surface of the extension section 20 of the bellows tube 2 and the inner surface of the perforation hole 60 of the connection member 6. The fine gap S5 extends through the seat section 63 and the annular groove 64 where the annular protrusion 22 is rested.

Then, the screw section 53 of the coupling nut 5 is screw-coupled with the screw section 67a of the connection member 6, so that the connection member 6 is integrally assembled with the bellow tube 2.

In addition, the first fastening section 72 of the intermediate ring 7 is engaged with the second fastening section 61 of the connection member 6 while forming the fine gap S6 therebetween.

Therefore, the gas contained in the bellows tube 2 can be discharged through the slots 65 and the gap S5 little by little. The gas may be cooled and gas pressure may be lowered as the gas passes through the slots 65.

After that, the gas passes through the gap S6 formed between the first and second fastening sections 72 and 61 and is discharged to the outside through the screw coupling section between the coupling nut 5 and the connection member 6.

Therefore, the gas contained in the bellows tube 2 can be discharged little by little so that the gas is not subject to the high temperature and high pressure.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A flexible joint apparatus for prevention of explosion comprising:
   a bellows tube including an extension section integrally formed at one end of the bellows tube and an annular protrusion interposed between the extension section and the bellows tube;
   a coupling nut coupled with the bellows tube while being prevented from being separated from the bellows tube by the annular protrusion; and
   a connection member coupled with the bellows tube while being supported by the annular protrusion such that the connection member is screw-coupled with the coupling nut,
   wherein a perforation hole is formed in the connection member in order to insert the extension section, and screw sections are formed at each end of the connection member, wherein a gap is formed between an outer surface of the extension section and an inner surface of the connection member and gas discharged from the bellows tube flows along the outer surface of the extension section through the gap and is discharged to an outside through a screw coupling section between the connection member and the coupling nut.

2. The flexible joint apparatus for prevention of explosion of claim 1, wherein a sleeve having roundness is fitted around the extension section.

3. The flexible joint apparatus for prevention of explosion of claim 1, wherein a braid is coated on an outer surface of the bellows tube and an adapter is coupled around the braid.

4. The flexible joint apparatus for prevention of explosion of claim 3, wherein a predetermined portion of the bellows tube corresponding to the adapter is expanded outward such that the braid is pressed against an inner surface of the adapter.

5. The flexible joint apparatus for prevention of explosion of claim 1, a seat section is provided adjacent to an inlet of the perforation hole such that the annular protrusion of the bellows tube is rested on the seat section.

* * * * *